United States Patent
Oserød

(10) Patent No.: US 7,144,503 B2
(45) Date of Patent: Dec. 5, 2006

(54) COMBINED DEGASSING AND FLOTATION TANK

(75) Inventor: Stein Egil Oserød, Kingscliff (AU)

(73) Assignee: M-I Epcon AS, Porsgrunn (NO)

( * ) Notice: Subject to any disclaimer, the term of this patent is extended or adjusted under 35 U.S.C. 154(b) by 0 days.

(21) Appl. No.: 10/363,127

(22) PCT Filed: Oct. 9, 2001

(86) PCT No.: PCT/IB01/01878

§ 371 (c)(1),
(2), (4) Date: Jul. 23, 2003

(87) PCT Pub. No.: WO02/41965

PCT Pub. Date: May 30, 2002

(65) Prior Publication Data

US 2004/0011745 A1    Jan. 22, 2004

(30) Foreign Application Priority Data

Nov. 21, 2000   (EP) ................................. 00610118

(51) Int. Cl.
*C02F 1/24* (2006.01)
*C02F 1/20* (2006.01)
(52) U.S. Cl. ................. 210/221.2; 210/188; 210/512.1; 96/182; 96/186; 96/209; 96/212; 96/216; 96/219; 55/337; 55/441
(58) Field of Classification Search ............ 210/221.2, 210/221.1, 703, 512.1, 188, 788, 789; 96/182, 96/186, 209, 212, 220, 216, 219; 55/337, 55/441; 95/261, 271; 166/75.12
See application file for complete search history.

(56) References Cited

U.S. PATENT DOCUMENTS

| 1,970,784 | A |   | 8/1934  | Walker               |
|-----------|---|---|---------|----------------------|
| 2,565,343 | A |   | 8/1951  | Benham               |
| 3,759,324 | A | * | 9/1973  | Mecusker ..... 166/75.12 |
| 3,797,203 | A |   | 3/1974  | Murdock, Sr.         |
| 3,802,501 | A | * | 4/1974  | Mecusker ..... 166/75.12 |
| 3,812,655 | A |   | 5/1974  | Bennett              |
| 3,885,933 | A |   | 5/1975  | Putney               |
| 3,988,132 | A |   | 10/1976 | Oranje               |
| 4,094,783 | A | * | 6/1978  | Jackson ....... 210/703 |
| 4,120,673 | A |   | 10/1978 | Nieden               |
| 4,331,534 | A | * | 5/1982  | Barnscheidt ..... 209/164 |

(Continued)

FOREIGN PATENT DOCUMENTS

DE    2812105 A1 *  9/1979

(Continued)

*Primary Examiner*—Thomas M. Lithgow
(74) *Attorney, Agent, or Firm*—Jacobson Holman PLLC

(57) ABSTRACT

A combined degassing and flotation tank for separation of a water influent containing considerable amounts of oil and gas. A rotational flow is created in the tank which forces the lighter components such as oil and gas droplets towards an inner concentric cylindrical wall where they coalesce and rise to the surface of the liquid and are removed via the outlet (3) whereas the heavier parts are forced down where the heavy particles sink to the lower part where they may be removed as a sludge. The water is discharged via an outlet in the lower part of the tank. The combined degassing and flotation tank is particular suited for use in oil production at sea for removal of oil and gasses from water streams before the water is returned to the sea.

5 Claims, 4 Drawing Sheets

DEGASSING AND FLOTATION TANK

1. TANK
2. INLET
3. OIL AND GAS OUTLET
4. WATER OUTLET
12. HORIZONTAL PLATE
10. INNER CYLINDER
11. INLET GUIDE VANE
8. SLUDGE OUTLET

U.S. PATENT DOCUMENTS

| | | | |
|---|---|---|---|
| 4,364,833 A | 12/1982 | Loegering | |
| 4,424,068 A | 1/1984 | McMillan | |
| 4,428,841 A * | 1/1984 | Favret, Jr. | 210/747 |
| 4,512,888 A * | 4/1985 | Flynn | 210/221.2 |
| 4,532,034 A | 7/1985 | Hans et al. | |
| 4,834,586 A | 5/1989 | Depew | |
| 4,889,638 A * | 12/1989 | Rockford et al. | 210/703 |
| 5,207,920 A * | 5/1993 | Jones | 210/703 |
| 5,224,976 A | 7/1993 | Oranje | |
| 5,236,587 A | 8/1993 | Keuschnigg | |
| 5,300,222 A | 4/1994 | Broussard, Sr. | |
| 5,958,249 A | 9/1999 | Fassbender et al. | |
| 6,077,433 A * | 6/2000 | Brun Henriksen et al. | 210/634 |

FOREIGN PATENT DOCUMENTS

| | | |
|---|---|---|
| DE | 197 19 798 C1 | 2/1999 |
| EP | 0 350 906 | 1/1990 |
| EP | 0 445 576 | 9/1991 |
| EP | 0 610 080 | 8/1994 |
| EP | 0 887 096 | 12/1998 |
| EP | 0 952 113 A2 | 10/1999 |
| FR | 530 029 | 12/1921 |
| FR | 2 640 161 | 7/1990 |
| GB | 217854 | 6/1924 |
| GB | 848977 | 9/1960 |
| GB | 2102308 A * | 2/1981 |
| GB | 2 338 192 | 12/1999 |
| JP | 02-207882 A * | 8/1990 |
| JP | 6-205917 | 7/1994 |
| WO | 91/01276 A1 * | 2/1991 |
| WO | 98/11976 | 3/1998 |
| WO | WO 98/51618 | 11/1998 |
| WO | 99/00169 | 1/1999 |
| WO | 99/20873 | 4/1999 |

* cited by examiner

DEGASSING AND FLOTATION TANK

1. TANK
2. INLET
3. OIL AND GAS OUTLET
4. WATER OUTLET
12. HORIZONTAL PLATE
10. INNER CYLINDER
11. INLET GUIDE VANE
8. SLUDGE OUTLET

COMBINED DEGASSING AND FLOTATION TANK

FIELD OF THE INVENTION

The present invention relates to separation of a mixture comprising water, a with water not miscible fluid having a lower density than water and a gas into these constituents.

In particular the present invention relates to a combined degassing and flotation tank, which is particular, suited for use in separation processes where a water phase containing oil and gas is separated into these constituents.

The invention is applicable within a broad range of industries comprising the petroleum industry, including oil exploration and production, refining, transport, storage, cleaning of tanks and/or equipment etc.

BACKGROUND FOR THE INVENTION

In the oil industry the production of crude oil involves pumping a mixture of oil, gas and water from subterranean reservoirs. At the well-head a initial separation usually takes place, and the crude oil still containing some gas and water is treated in one or more separators to remove more water and gas before the crude oil is ready for refining.

At offshore oil production the water phase coming from the separation at the well-head or subsequent separators is usually discharged into the sea after a cleansing that involves the partial removal of gas, oil, chemicals and other impurities. Today this cleansing is accomplished using large equipment such as oil/gas separators, flotation tanks, hydro cyclones and degassing tanks occupying a substantial space at the production platforms.

With ageing of the oil fields one often finds that the volume of water accompanying the oil becomes much larger and consequently the capacity for water treatment often needs to be increased to treat the increasing amounts of water.

Further, there is a general concern of the pollution caused by oil production at sea, particular when the oil production takes place in areas that are considered as environmentally fragile, such as arctic areas or fishing areas. In the oil industry there is a fear that a demand for a significant lower limit for the outlet of oil would turn the oil production from a number of the known reservoirs uneconomical if one has to rely on the equipment used at present. Thus great efforts have been made by industry and authorities to find ways to reduce the outlet of oil during oil production at affordable prices.

On oil production platforms intended for operation at sea very limited space is usually available. Therefore there are very strict constraints on the space available for installation of new equipment that may be needed in order to handle increasing amounts of water, in particular if one should honour the rising concerns for the environment and reduce the pollution. An even stricter constraint on space may be encountered if one considers the establishment of an oil production at the sea bed level.

In the prior art a number of oil-gas-water separators are known. In U.S. Pat. No. 4,424,068 a separator and a method for separating a mixture of oil, gas and water, such as may be received from an oil-well is described. The separator is in the form of a vessel divided into separation chambers and provided with a number of baffles and a dynamic separator where the incoming mixture changes direction several times. Despite that the separator have been known for several years it seems not to have been widely used. Further as the separator comprises several chambers and many parts the maintenance will be time consuming which may lead to costly stop of oil production.

U.S. Pat. No. 4,364,833 describes a separator comprising one sector containing numerous plates arranged horizontally and parallel in order to confer coalescence of small oil drops to larger oil drops, and a second sector containing numerous plates arranged vertically and parallel in order to let the formed larger oil drops rise to the top where they form an oil layer which is collected. As the separator contains a number of narrow passages between the parallel plates these passages are susceptible for clogging by solids contained in the incoming flow, which may lead to stop for cleaning.

U.S. Pat. No. 3,797,203 describes a separator containing a number of conically formed screens on the surface of which small oil droplets coalescence to larger oil drops which rise to the top of the separator where they can be collected as an oil phase.

WO 99/20873 describes a sand trap that may be placed on an oil well in order to remove heavier particles such as sand before further processing of the crude oil. The device has a mouth towards a relatively narrow part of a tank with a spatial connection towards a relatively widened part of the tank where sand and heavy particles precipitate.

Despite the number of known oil-gas-water separators there is still a need for an improved oil-gas-water separator with a better separation of the phases, which do not need large spaces, which can be continuous operated with low requirement for maintenance and which can be manufactured and operated at moderate price.

BRIEF DESCRIPTION OF THE INVENTION

It has now been found that these needs may be fulfilled by using a combined degassing and flotation tank comprising an essentially cylindrical vertical tank (1), a tangentially arranged inlet (2), at least one outlet (3) for gas and oil placed in the upper part of the tank, an outlet (4) for water placed in the lower part of the tank and an inner concentric cylindrical wall forming a flotation and degassing zone between said inner concentric wall and the wall of the tank in the upper part of the tank.

It has turned out that the combined degassing and flotation tank according to the present invention can perform the desired separation of an oil/gas phase from a water phase with a surprisingly high efficiency. In use for water treatment in oil production remaining oil and gas can be removed from the outgoing water phase providing an effluent with a very low content of hydrocarbons simultaneously with the removal of sand and other particulate materials. Further, as the throughput of the tank is very high the space requirement is very modest in relation to the amount of treated water.

In one preferred embodiment the inner concentric cylindrical wall is formed as an inner cylinder placed in the upper part of the tank leaving an open space between said cylinder and the top of the tank, and further comprising an inlet guide vane (11) placed between the tank (1) and the inner cylinder (10) leaving an open space between the inner cylinder (10) and the inlet guide vane (11), and means for establishing calm streaming around the outlet (4) for water.

In another preferred embodiment the combined degassing and flotation tank according to the invention comprises an essentially cylindrical vertical tank (1), a tangentially arranged inlet (2), an outlet (3) for gas and oil placed in the upper part of the tank, an outlet (4) for water placed essentially in the centre of the bottom, and an essentially concentrically arranged vertical first baffle (5) extending from the top of the tank leaving a passage for water in the lower part of the tank and a passage for gas in the upper part of the tank and an essentially concentric, cylindrical vertical inner baffle (6) of a smaller diameter that the first baffle (5) and extending from the bottom of the tank leaving a passage in the top portion of the tank.

In another preferred embodiment a filtration unit, such as an unit of the adsorption filter type, is connected to the outlet of the combined degassing and flotation tank, which embodiments leads to a very efficient and high removal of hydrocarbons from the water.

The combined degassing and flotation tank according to the invention is particular suited for treating the water phase originating from the well-head or from subsequent separators before said water phase is discharged to the sea at offshore oil production plants.

Thus, the use of the combined degassing and flotation tank in oil production forms another preferred aspect of the invention.

DETAILED DESCRIPTION OF THE INVENTION

Figure 1:
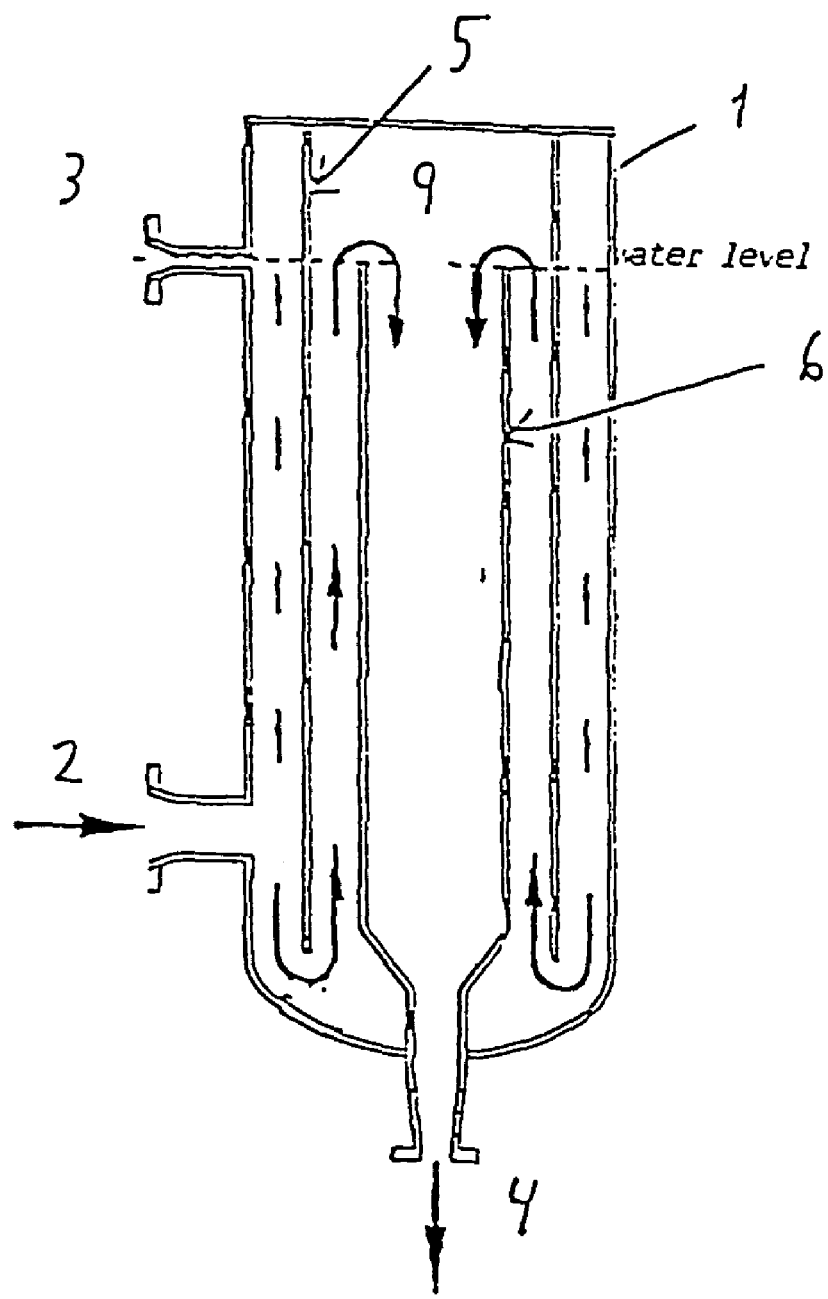
FIG. 1. is a schematic section through a combined degassing and flotation tank according to the invention, FIG. 2. is a schematic section through a combined degassing and flotation tank according to the invention provided with a centrally placed screen (7) and an outlet for sludge (8), showing the flow in the tank, FIG. 3. is a schematic section through a combined degassing and flotation tank according to the invention where an inner cylinder (10) is placed essentially in the upper part of the tank, leaving an open space between the cylinder and the top of the tank, and extending approximately ⅔ down into the tank. The tank is further provided with an inlet guide vane (11) and a horizontal circular plate (12) placed in the lower part of the tank, leaving an open spate between the plate and the wall of the tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is based on the recognition of that flotation of oil drops is significantly facilitated by the simultaneously rising of gas bubbles. Further as the incoming fluid in the tank according to the present invention is conducted into an upwards spiralling movement it is believed that due to the rotation the lighter constituents such as oil drops and gas bubbles will be forced towards the centre of the tank until the inner concentric cylindrical wall is met where oil bubbles and gas bubbles will coalesce and rise due to the lower density than the surrounding water.

Simultaneously sand and other heavy particles that may be entrained by the inlet mixture are forced towards the wall of the tank (1) and fall to the bottom.

Thus according to the invention a flotation and degassing zone is formed in the space between the tank and the inner concentric cylindrical wall in the area from the inlet and up.

The inlet for water is arranged essentially tangentially in order to provide a rotational movement of the water in the tank.

An inlet guide vane (11) may be provided in connection to the inlet (2) for contaminated water. In this connection an inlet guide vane is a vane arranged on the wall of the tank in order to guide the incoming water into an upward spiralling flow. The inlet guide vane may be short or long extending from 30–330° of the circumference of the tank, preferred 90–300°, more preferred 180–300°, and most preferred around 270°. The inlet guide vane is placed so that an open space is found between the vane (11) and the inner concentric cylindrical wall.

The incoming water is let along the vane until the end of the vane where the water continues in a fan-like pattern, where a part of the water will be "recirculated" in another round along the vane whereas the remaining of the water escapes the circulating. The recirculating fraction is to a large extent determined by the inclination of the vane. By experiments it has been determined that a suitable inclination for the vane is in the range of 5–15°, more preferred 5–10° and most preferred approximately 7°. At this inclination a suitable recirculated fraction is obtained without unduly obstructing the flow.

The term "in connection to the inlet" is intended to mean that the inlet guide vane is arranged so the vane meets the incoming water and guides the incoming water into an upwards spiralling flow.

The outlet for water is placed in the lower part of the tank. It is preferred to place the outlet in a location where the water is streaming calmly in order to secure that no oil or gas droplets are entrained because of high streaming velocity. Means for establishing calm streaming around the outlet may be provided in order avoid entrainment of oil drops by the rapid water stream. These means may be designed as a horizontal circular plate leaving an open space between the plate and the tank if the outlet is placed essentially in the centre of the bottom, or it may be designed as an downward open ring providing shelter for the outlet if the outlet is placed as one or more outlets in the lower part of the side of the tank.

Depending on the location of the outlet the solid material falling into the bottom of the tank may form a sludge. The deposition of sludge and solid material in the lower part of the tank is disadvantageous as the separating capacity of the tank may be lowered.

If the outlet for water (4) is placed at the lowest point of the tank, the falling solid material will mainly be entrained by the water streaming out and thus removed, provided that the tank is not provided with any baffles extending from the bottom. If the outlet for water is placed in a location that allows deposition of sludge it is preferred to provide the tank with an outlet (8) for sludge. The outlet for sludge may be designed for continuous or discontinuous removal of sludge.

One or more outlets for oil and gas may be provided. If more than one outlet for oil and gas is provided one of these outlets may serve as an outlet for gas whereas another may serve as an outlet for oil.

In connection with the present invention the term "essentially cylindrical" means that the tank is substantially circular and the top and bottom of the tank is plane or curved. In use the tank is placed so that the axis of the cylinder is essentially vertical.

Figure 3:
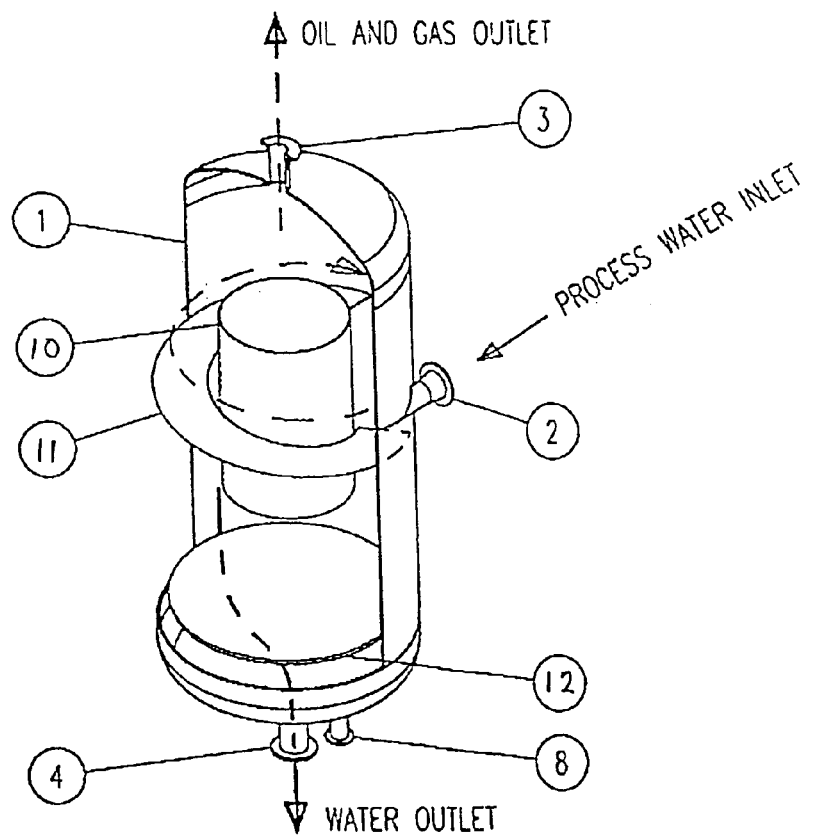

In one embodiment of the invention as shown in FIG. 3, the combined flotation and degassing tank is provided with an inner cylinder (10) placed in the upper part of the tank leaving an open space between said cylinder and the top of the tank, and further comprising an inlet guide vane (11) placed between the tank (1) and the inner cylinder (10) leaving an open space between the inlet guide vane and the inner cylinder and a horizontal circular plate (12) leaving a passage for water between the plate and the tank.

The inner cylinder (10) is arranged so that passage of oil, gas and water is allowed over the top of the cylinder. The cylinder may extend approximately ½–¾ down into the tank, preferably approximately ⅔ down the tank.

The ratio of the diameter of the inner cylinder to the tank may be selected between wide limits so that the passage of water is not limited. Preferably this ratio is selected between 0.3 to 0.75, more preferred 0.4–0.6 and most preferred approximately 0.5.

Figure 2:
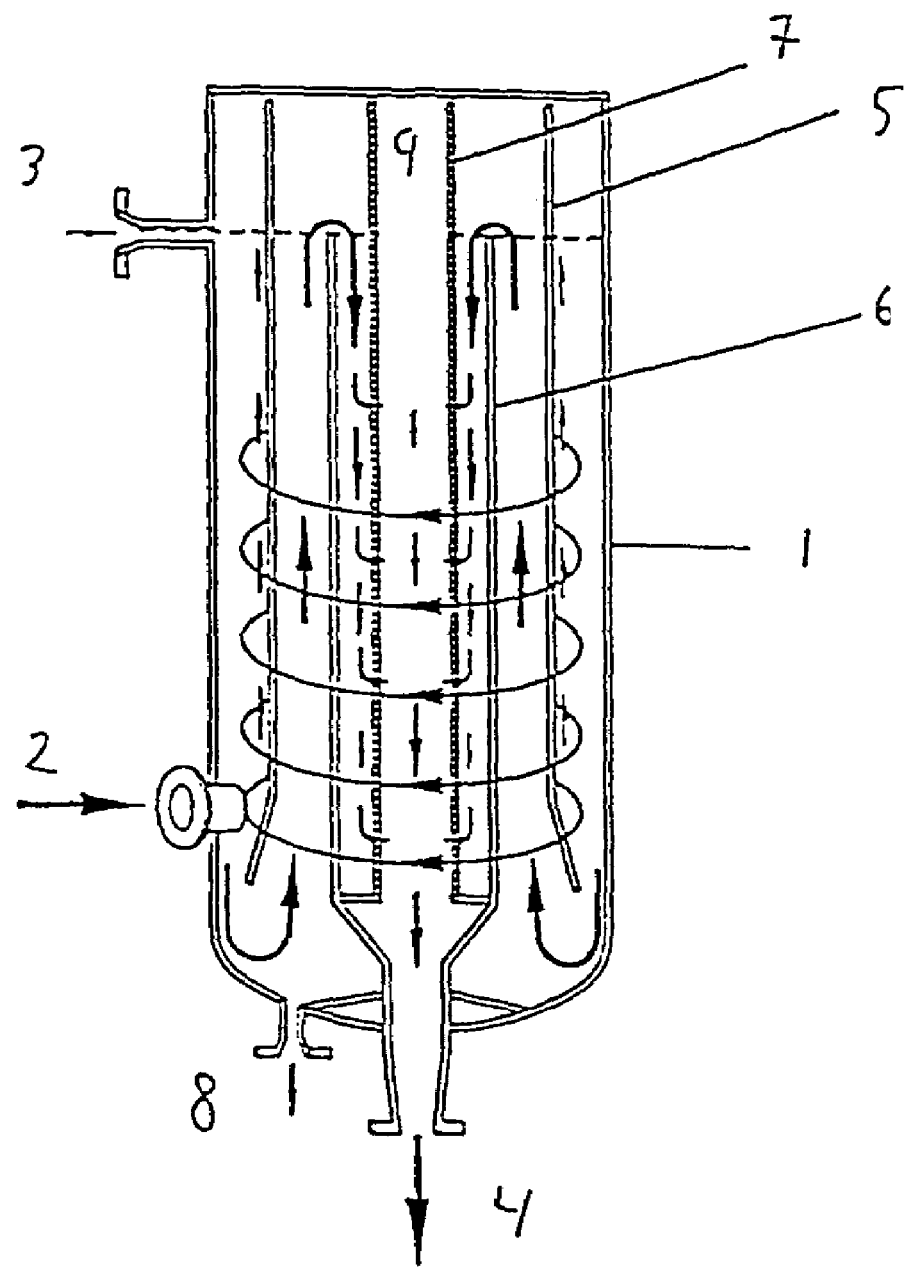

In another embodiment as shown in FIGS. 1. and 2., a tank (1) is provided with a inlet (2) placed in the lower part of the tank. The inlet (2) is arranged tangentially, which causes the incoming water to rotate in the tank as illustrated in FIG. 2. This rotation creates a centrifugal force which forces the lighter oil drops towards a baffle (5), where they coalesce forming larger drops that eventually rise and are gathered on the top of the liquid between the tank wall and the first baffle (5). Here the oil is removed via an outlet for oil and gas (3).

The water is forced down under the first baffle (5) and up between said first baffle and the outlet (4) and/or the inner baffle (6). The water rises to a certain level, and leaves the tank via the outlet (4).

The baffles are formed essentially as cylinders open in one end and the other end closed by the top or the bottom of the tank.

The first baffle (5) is extending from the top of the tank and may be placed forming a gap between said first baffle (5) and the top of the tank. The first baffle (5) may be formed having a uniform diameter along the total height of the baffle, or it may be formed having a larger diameter in the lower end in order to provide a maximal rotational speed of the liquid in the inlet zone.

The inner baffle (6) is extending from the bottom of the tank and is in one embodiment formed by an extension of the water outlet (4). In the combined degassing and flotation tank according to the invention the inner baffle (6) provides a function as an overflow for the tank determining the water level of the tank. The inner baffle (6) may be formed by the outlet pipe (4) extended to the desired water level.

It is preferred that the water level is redetermined to the same level as the outlet for oil and gas (3) in order to obtain a continuous removal of oil and gas from the tank avoiding accumulations which may lead to reduced capacity for separation.

Between the first baffle (5) and the inner baffle (6) may be inserted further baffles, which preferably are arranged extending alternatively from the top and the bottom of the tank. Such baffles will force the water to make extra travels up and down the tank, which may allow more gas to escape from the water phase.

Each baffle is arranged substantially concentrically with the tank, and should be designed to allow passage of gas in the upper end.

The tank is operated at low pressure in order to let the gas escape the water phase. By low pressure is meant a pressure below 10 bar, such as less than 5 bar or even at atmospheric pressure. By such a low pressure most of the gas will form bubbles in the zone around the inlet (inlet zone) and will as the oil drops be forced to the first baffle (5) where they rise to the top of the tank where the gas leaves via the outlet for oil and gas.

The formation and rise of gas bubbles in the inlet zone further mimics the effects created in traditional flotation tanks where the rise of bubbles of added air leads to an enhancement of the separation of oil from the mixture. Without wishing to be bound by the theory it is believed that bubble formation and subsequently rise of the formed bubbles in the inlet zone of the combined degassing and flotation tank according to the invention is contributing to the surprisingly high separation efficiency observed.

Due to the beneficial effect of the rising gas bubbles it may even be useful to inject additional gas in the contaminated water before entering into the combined degassing and flotation tank, if the amount of gas in the water is low. It is within the skills of the person skilled in the art to determine the optimal amount of gas in a given contaminated water source and to determine if injection of gas may be advantageous in order to obtain a desired cleansing.

The combined degassing and flotation tank may be provided with a screen to remove fine particles such as asphaltenes, from the effluent. The screen may be placed integrally in the tank as a central cylindrical screen (7) forming a tube around the outlet (4), it may be placed directly mounted to the outlet or as a separate unit outside the tank connected to the outlet.

In one embodiment the inner baffle (6) is formed by the screen (7), in which case the water level is determined by the flow rate through the screen (7).

The screen is made as conventional screens using known materials and designs for screens, as it will be known to the person skilled in the art.

In the case of a combined degassing and flotation tank equipped with a inner baffle (6) and a central cylindrical screen (7) the tank is conveniently provided with a outlet for removal of material retained by the screen (not shown in the figures) placed in the bottom next to the outlet (4) for the effluent.

The person skilled in the art will appreciate that the combined degassing and flotation tank according to the invention may be used for 2, 3 or 4 phase separations where the phases may be selected from water, oil, gas and solid materials, where at least one of the phases is liquid under the condition of operation.

The dimensions of the combined degassing and flotation tank may be selected depending on the amounts of water intended to be treated. In operation is has been found that the residence time in the tank for a liquid to be treated may be selected between 5 and 300 seconds, preferably 5–150 seconds, more preferred 10–60 seconds, even more preferred 10–40 seconds. A particular preferred residence time is about 20 seconds.

For the combined degassing and flotation tank according to the invention, an efficient flotation volume may be calculated as the volume of the space bounded by the tank (1) and the height of the liquid in the tank. Based on the residence time the capacity of the tank may be calculated e.g. a tank with a efficient flotation volume of 1 $m^3$ and a residence time for the liquid of 20 seconds has a capacity of 180 $m^3$ per hour.

The ratio of height to diameter of the tank can be selected within wide limits preferably in the range of 1:1 to 4:1 more preferred from 1:1 to 2:1.

It is within the skills of the person skilled in the art to select materials used for the construction of the tank based on the actual conditions for the intended use, such as the amounts of liquid to be treated, the composition of said liquid, the selected pressure, the temperature of the liquid and the presence of possible corrosive chemicals in any of the phases of the mixture.

In the way the combined degassing and flotation tank is formed all surfaces are vertical or at least having a steep inclination or subjected to a rapid flow, which prevents deposit of solids, with the exceptions of the surfaces in the sectors intended for collection of particulate material and sludge, which sectors also preferably have outlets for removal of these materials. Further no narrow passages are present in the tank. Consequently there is no place in the combined degassing and flotation tank according to the invention, which is susceptible to clogging by solid materials. Therefore the combined degassing and flotation tank may be operated continuously without or only with a minimal need for maintenance. The necessary maintenance such as replacement of a cylindrical screen if so provided can easily be performed from the top of the tank, which preferably is constructed to be removable. Thus the combined degassing and flotation tank according to the invention has a remarkable robustness i.e. it can be run for long periods without interruptions, and the few stops that may be required for maintenance can be made short.

The high capacity combined with the small occupied space and the robustness of the combined degassing and flotation tank according to the invention makes it particular suited for use at off-shore oil plants such as oil production platforms. Further it is also well suited for use in oil production in plants located on the sea bed, because at such a location the constraints on space may be even stricter than on traditional oil production platforms and the capacity for maintenance may be lower.

Additives such as flocculants may also be added to the water before entering into the combined degassing and flotation tank according to the invention in order to improve the cleaning efficiency.

In use the combined degassing and flotation tank according to the invention routinely reduces the oil content of an oil/water mixture to 20 mg/l or less starting from several hundred mg/l e.g. 200–800 mg/l.

Full-scale tests (more that 150 m$^3$/h) have shown that the oil content can be lowered from several thousand ppm down to approximately 10 ppm and leaving the water essentially free of gas In a preferred embodiment the combined degassing and flotation tank is used in combination with a filtration unit, preferably of the adsorption/absorption type, which filtration unit may further reduce the oil content of the effluent water. A particular suited filtration unit for such a combination is the filtration unit disclosed in the European Patent application No. 00610080.4. Starting from an oil/gas/water mixture containing 400–800 mg hydrocarbons per litre, a reduction of hydrocarbon content to less than 20 mg/l after the combined degassing and flotation tank and a further reduction to 5 mg/l or less after the filtration unit can routinely be obtained, while the high throughput is maintained.

Even though the combined degassing and flotation tank has been described mainly with respect to uses in oil production the invention is not limited to such uses but can be used within a broad range of industries where separations of a liquid mixture of water, a liquid insoluble in water and a gas takes place.

Now the invention is described by an example, which should not be regarded as limiting for the invention.

EXAMPLES

Example 1

A combined degassing and flotation tank corresponding to FIG. 2, having a diameter of 500 mm and a height of 1200 mm and an efficient flotation volume of 125 litre, was tested on water phase effluent from a second step oil separator from a commercial oil production platform. The sample water contained varying amounts of oil and gas in the range equivalent to approximately 50–200 mg hydrocarbon per litre. The intake varied between 1.8 and 9.5 m$^3$/h.

The output water contained approximately 20 mg hydrocarbon per litre or less, during most of the experiments less than 20 mg/l. The efficiency of cleaning calculated as percentage hydrocarbon removed was during most of the experiment between 80 and 90%.

Figure 4:
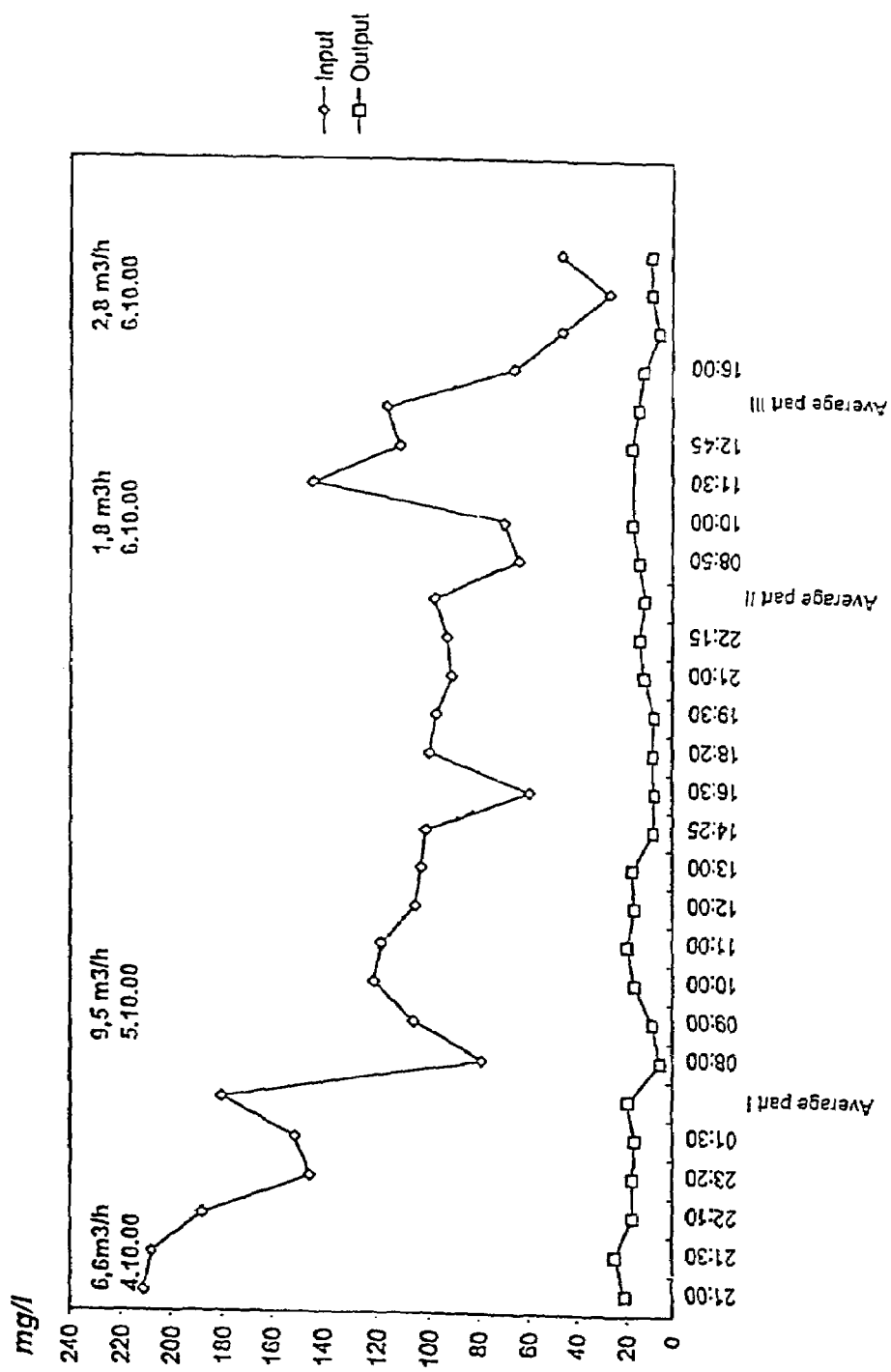
FIG. 4. is a graph belonging to the experiment indicated in the example showing the efficiency of the combined degassing and flotation tank according to the invention.

The actual data is shown in FIG. 4, which is a graph showing the concentrations of hydrocarbons in the inlet and the effluent stream of the combined degassing and flotation tank measured at regular intervals during the experiment.

Example 2

A combined degassing and flotation tank was designed essentially as depicted in FIG. 3 having the following dimensions:

| | |
|---|---|
| Height | 2530 mm |
| Diameter of tank | 1130 mm |
| Diameter of inner cylinder | appx. 500 mm |

And the inner cylinder extending approximately ⅔ down into the tank.

This combined degassing and flotation tank was run in a full scale with an inlet of 150 m3/h.

The plant was operated continuous with out breaks in more that 6 months with an inlet of water contaminated with approximately 200–600 ppm hydrocarbonaceous oil and gas and an outlet containing 5–10 ppm.

This study confirms the high throughput with high cleansing efficiency essentially without need for intermittently breaks for maintenance.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A combined degassing and flotation tank for gas, oil and water separation comprising an essentially cylindrical vertical tank having a top, a tangentially arranged inlet, at least one outlet for gas and oil in an upper part of the tank, an outlet for water placed in a lower part of the tank, and an inner concentric cylindrical wall forming a flotation and degassing zone between said inner concentric wall and a wall of the tank in the upper part of the tank, said concentric cylindrical wall being formed as an inner cylinder placed in the upper part of the tank leaving an open space between an uppermost part of said cylinder and the top of the tank where gas is collected, and further including an inlet guide vane placed between the tank and the inner cylinder leaving an open space between the inner cylinder and the inlet guide vane, and a structure for establishing calm streaming around the outlet for water.

2. The combined degassing and flotation tank according to claim 1, wherein the inner cylinder extends approximately ⅔ down into the tank.

3. The combined degassing and flotation tank according to claim 1, wherein the inlet guide vane has an upward inclination of approximately 7°.

4. The combined degassing and flotation tank according to claim 1, wherein the structure for establishing calm streaming around the outlet for water includes a horizontal circular plate.

5. The combined degassing and flotation tank according to claim 1, further comprising an outlet for sludge arranged in the lowest part of the tank.

* * * * *